S. M. FIREBAUGH.
CULTIVATOR SHIELD.
APPLICATION FILED NOV. 4, 1913.
1,109,978.
Patented Sept. 8, 1914.
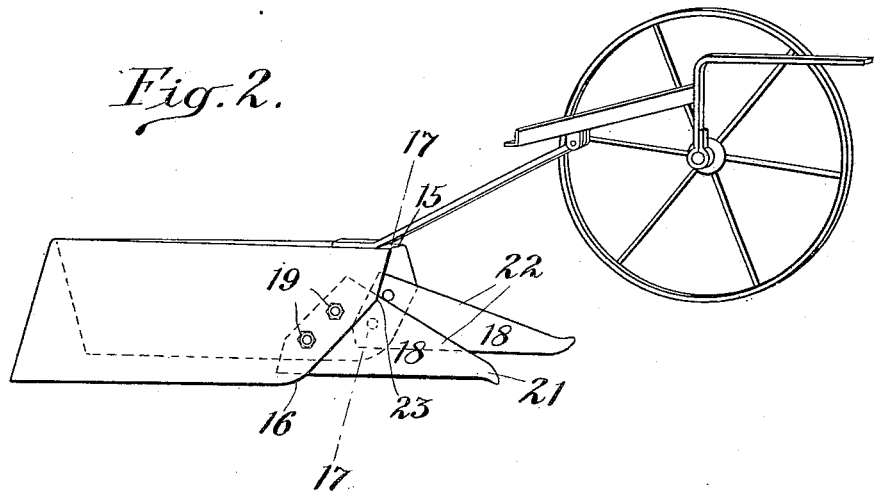
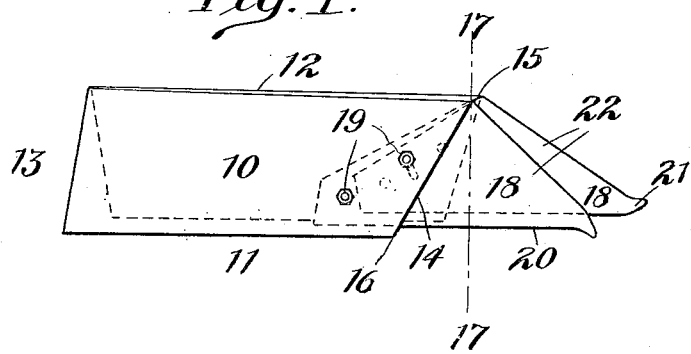
Samuel M. Firebaugh, Inventor

UNITED STATES PATENT OFFICE.

SAMUEL M. FIREBAUGH, OF VICI, OKLAHOMA.

CULTIVATOR-SHIELD.

1,109,978.  Specification of Letters Patent.  Patented Sept. 8, 1914.

Application filed November 4, 1913. Serial No. 799,219.

*To all whom it may concern:*

Be it known that I, SAMUEL M. FIREBAUGH, a citizen of the United States, residing at Vici, in the county of Dewey and State of Oklahoma, have invented certain new and useful Improvements in Cultivator-Shields, of which the following is a specification, reference being had therein to the accompanying drawing.

My invention relates to cultivator shields of the type very commonly used in connection with double row cultivators, for the purpose of protecting small plants from being damaged by earth which might fall upon or among them while it is being stirred up by the cultivator. This type of cultivator shield is quite old in the art, but despite the long periods of use which shields of this type have had, I have found them incapable of effectually meeting the conditions found when the plants vary in size between that size so small that it needs the protection of the shield, and the next larger size in which the plant very frequently grows or is blown by the winds out of the even row in which the small plants for the most part lie.

The principal object of my invention is to produce a cultivator shield of this type which will effectually take the larger plants as well as the smaller plants into its protection without damaging them.

Damage to the plants very frequently results in the use of the old forms of cultivator shields due to several causes. One of them is the fact that there are present on the advance end of the cultivator shield at times very sharp transversely disposed edges and some times edges at an angle to each other forming scissors gaps, both of which tear and nip off the leaves of the plants as they are righted and some times tear the plant up by the roots when the plant is caught thereupon and is not cut or torn. Another very frequent cause of damage is the fact that the cultivator does not effectually lift the plants lying out of the row but rides over them in which case they may be mutilated or nipped off by the elongated and sharp lower edge of the shield. Some times also, the advance points of the shield which accomplish the lifting of the plants become choked with weeds and grass, resulting in the catching and tearing of the plants or in failure to lift them. This is especially true when the field is not clean. In this latter case, if the lifting points become so far clogged with trash as to drag heavily, or if they are improperly disposed, they will dig into the earth or under some obstruction and cause an up-ending of the cultivator shield and a deflection of its course, damaging all plants which come in its way, and permitting the plowed earth to fall upon the then unprotected plants. This latter happening of course necessitates stopping of the machine and re-adjustment of the shield and the damaged plants. The shield of my invention prevents all damage from these causes as well as from some other and minor causes which will fully appear.

In the accompanying drawings I show two embodiments of the shield of my invention, although I wish it understood that my invention may be given other embodiments without departing in any wise from its spirit.

Figure 1 shows in perspective the one form of my invention, and Fig. 2 shows in perspective the other attached to the cultivator, the cultivator being conventionally shown by one wheel and a portion of the frame thereof.

Referring first to the embodiment of Fig. 1, the shield shown is a trough shield adapted to straddle a row of plants. 10 is the main body of the shield. It is elongated in shape, having its lower edges 11 substantially parallel to its top 12. Its rear end 13 is formed on lines substantially at right angles to the main body, but its front end 14 is cut away downwardly and rearwardly from the uppermost and foremost point 15, whereby the engaging points 16 of the lower edges 11 are located to the rear of a vertical line 17—17 passing through the foremost point 15.

Attached to each side of the main body 10 and to the inner face thereof is a forwardly projecting triangularly shaped plant lifting blade 18. Instead of being rigidly attached, these are removably secured by bolts 19 as clearly shown, though my invention contemplates forming these plant lifting blades 18 integrally with the main body 10. The lower edges 20 of these blades lie above the lower edges 11 of the main body 10 an inch or more, but are substantially parallel thereto. The engaging points or noses 21 are somewhat blunt and rounded, and the foremost ends of the blades 18 are turned outwardly and laterally on curved lines whereby they lie without the planes of the main bodies of the blades 18, which bodies of the blades lie substantially within the planes of the sides of the trough 10.

By virtue of the shape and disposition of the engaging points 21, and the elevation of the lower edges 20, choking of the blades 18 on trash, and digging of the same into the earth are effectually prevented. I have actually operated my invention as thus constructed over long periods of time without any mishap whatsoever due to these causes. At intervals however, the blades are apt to be damaged by striking an obstruction such as a root or the like, and then I find it very convenient to have them removable, whereby repairing or replacing is rendered easy. An added advantage in having the blades removable is that they can be left off the machine when cultivating the very young plants, thus avoiding unnecessary wear and possible damage. The upper edges 22 of the blades are inclined upwardly and rearwardly and join the main body 10 at the foremost point 15, or on the transverse line 17—17 of its foremost portion at an obtuse angle thereto. By virtue of this disposition of the upper edges 22 with respect to the main body of the trough 10, abrupt edges and scissors gaps which might cut and injure or catch and destroy plants are effectually eliminated, and the plants once engaged by the points 21 of the blades 22 are lifted gently and sufficiently by the upwardly inclining edges 22 to place them wholly within and between the main bodies of the blades 18 and the sides of the trough 10 without the slighest damage. By virtue of the outwardly curved points 21 also, and their elevation above the lower edges 11, the larger plants of the row, which are the troublesome ones at the stage of growth above mentioned, are reached much more effectually.

The second embodiment of my invention differs from the first very slightly, the difference arising through adaptation of my invention to another form of commercial cultivator shield. Instead of having the main body 10 cut away between points 15 and 16 on a straight line as in case of the form of Fig. 1, this cultivator shield has the front end cut away first on approximately vertical line between points 15 and 23, and then rearwardly to point 16 on an oblique line 23—16. In such case according to my invention I form the blades 18 so that their upper edges 22 join the main body 10 at the point 23 which point lies on a transverse line 17—17 passing through the foremost point 15. Simply expressed, the upper inclined lifting edges 22 of the blades in any case should join the main body 10 at the foremost point or line whereby acute angles of juncture forming scissors gaps are absolutely avoided. Thus the angles 21, 23, 15 are in each case very obtuse angles, and it should be observed that if the removable blades were attached on a vertical line in the ordinary manner, with a horizontal edge meeting a vertical edge, or even perhaps with the edges meeting so as to inclose less than a right angle between them, damage would be almost unavoidable to the larger plants which it is the purpose of my invention to protect. It should further be noted that with the front edge of the shield cut away on the oblique line 14, not only is the lower angle between the edge of the shield and the edge of the blade rendered obtuse, but when the blades are removed, as in cultivating very small plants, the shield will pass readily over minor obstructions with no liability of damage to itself or the plants.

I have not deemed it necessary to show the cultivator plows and other parts. Their disposition on either side of the cultivator shield is well known, as is also the position of the cultivator shield as respects the row, the trough 10 simply straddling and housing in the little plants as the cultivator passes along, thus preventing the earth which is stirred by the cultivator from falling upon or with sufficient force among the plants to do harm to them.

I am aware that forwardly projecting blades have heretofore been used in connection with both trough and plate shields for cultivators and plows. I am also aware of the patent to Austin and Gardiner No. 205,463, July 2, 1878 and others of similar nature covering such points. Hence I do not claim the use of such points broadly, but such features of construction of the same as are set forth in the annexed claims. It is this structure which constitutes my invention, and through which I attain the object set forth.

Obviously in case of single row cultivators, a trough shield 10 is not necessary, one side of the trough and its associated blade 18 being used alone instead, taking the form of the well known plate shield.

I wish it to be understood that while I have shown the blades as bolted fast at 19, there may be slots in the blades or slots in the shield, or both, for purposes of adjustment, and I consider such slots if used to fall within the scope of my invention. One such slot is indicated in dotted lines in Fig. 1, and a similar slot may be provided for every bolt if desired.

What I claim is:

1. A cultivator shield comprising a guard plate adapted to be drawn by a cultivator, and having at its front end a forwardly extending plant lifting blade removably secured to the inner face of said guard plate, said blade being formed of sheet material, of triangular shape, and having its lower edge projecting along a line parallel to but raised above the lower edge of said guard plate, and its upper edge extending upwardly and rearwardly at an angle and joining said guard plate at an obtuse angle with the front edge thereof.

2. A cultivator shield comprising a guard plate adapted to be drawn by a cultivator and having at the front end a forwardly projecting plant lifting blade, the main body of which blade lies in the same plane as said guard plate, but the engaging end of which is bent laterally on a curved line from said main body and away from the stalks of the plants being cultivated, whereby digging of the point of said projection into the earth is prevented, and large plants are reached and lifted at a point sufficiently removed from the stalk to prevent uprooting or breaking.

In testimony whereof I affix my signature in presence of two witnesses.

SAMUEL M. FIREBAUGH.

Witnesses:
F. A. CARMONY,
N. W. TERRY.

Copies of this patent may be obtained for five cents each, by addressing the "Commissioner of Patents, Washington, D. C."